(12) United States Patent
Saito et al.

(10) Patent No.: US 10,419,238 B2
(45) Date of Patent: Sep. 17, 2019

(54) RADIO

(71) Applicant: OMRON Corporation, Kyoto-shi, Kyoto (JP)

(72) Inventors: Keisuke Saito, Suita (JP); Taiji Yoshikawa, Kizugawa (JP)

(73) Assignee: OMRON Corporation, Kyoto-shi (JP)

( * ) Notice: Subject to any disclaimer, the term of this patent is extended or adjusted under 35 U.S.C. 154(b) by 154 days.

(21) Appl. No.: 15/680,740

(22) Filed: Aug. 18, 2017

(65) Prior Publication Data

US 2017/0346655 A1 Nov. 30, 2017

Related U.S. Application Data

(63) Continuation of application No. PCT/JP2016/056157, filed on Mar. 1, 2016.

(30) Foreign Application Priority Data

Mar. 6, 2015 (JP) ................................ 2015-044822

(51) Int. Cl.
*H04L 12/403* (2006.01)
*H04W 4/38* (2018.01)
(Continued)

(52) U.S. Cl.
CPC .......... *H04L 12/403* (2013.01); *H04L 12/28* (2013.01); *H04L 29/08* (2013.01); *H04W 4/38* (2018.02);
(Continued)

(58) Field of Classification Search
None
See application file for complete search history.

(56) References Cited

U.S. PATENT DOCUMENTS 5,943,315 A * 8/1999 Iwasawa ............... G08C 15/00
370/216
6,097,441 A * 8/2000 Allport ............ H04N 21/43632
348/120
(Continued)

FOREIGN PATENT DOCUMENTS

JP 2006-211480 A 8/2006
JP 2009-218712 A 9/2009
(Continued)

OTHER PUBLICATIONS

The extended European search report (EESR) dated Apr. 19, 2018 in a counterpart European Patent application.
(Continued)

*Primary Examiner* — Bunjob Jaroenchonwanit
(74) *Attorney, Agent, or Firm* — Metrolex IP Law Group, PLLC (57) ABSTRACT

Provided is a radio formed to be capable of performing wireless communication with one driving apparatus, and configured to be connected, through one communication port via wired communication, to a slave control apparatus configured to be communicably connected to a master control apparatus with a predetermined communication method, the radio including an identification information collection unit collecting, from the one driving apparatus, identification information for identifying the one driving apparatus, when the radio is initially connected to the one driving apparatus via wireless communication, and a transfer control unit mediating data transfer between the master control apparatus and the one driving apparatus, such that the one driving apparatus is directly connected to the one communication port in a virtual manner, based on the identification information of the one driving apparatus collected by the identification information collection unit.

6 Claims, 6 Drawing Sheets

(51) Int. Cl.
   *H04L 12/28* (2006.01)
   *H04L 29/08* (2006.01)
   *H04W 4/33* (2018.01)

(52) U.S. Cl.
   CPC ...... *G05B 2219/1215* (2013.01); *H04L 67/12* (2013.01); *H04W 4/33* (2018.02)

(56) References Cited

U.S. PATENT DOCUMENTS

| | | | | |
|---|---|---|---|---|
| 7,099,295 | B1* | 8/2006 | Doyle | H04W 88/08 370/338 |
| 9,888,081 | B1* | 2/2018 | Farinelli, Jr. | H04W 40/20 |
| 10,127,803 | B2* | 11/2018 | Saito | H04W 4/30 |
| 2002/0062410 | A1* | 5/2002 | Sasamori | H04L 12/403 710/36 |
| 2002/0103946 | A1* | 8/2002 | Gaiser | G05B 19/00 710/11 |
| 2004/0018817 | A1* | 1/2004 | Kanayama | H04W 52/0229 455/77 |
| 2006/0077917 | A1* | 4/2006 | Brahmajosyula | H04L 12/4625 370/310 |
| 2006/0092858 | A1* | 5/2006 | Kynast | H04L 12/403 370/254 |
| 2006/0268764 | A1* | 11/2006 | Harris | H04W 72/0486 370/328 |
| 2008/0273486 | A1* | 11/2008 | Pratt | H04L 12/403 370/328 |
| 2009/0248933 | A1* | 10/2009 | Fukuda | H04L 1/188 710/110 |
| 2010/0124232 | A1* | 5/2010 | Takada | H04L 12/40143 370/401 |
| 2010/0131610 | A1* | 5/2010 | Furtner | H04L 12/40019 709/208 |
| 2011/0093635 | A1* | 4/2011 | Matsumoto | H04L 12/403 710/110 |
| 2013/0103795 | A1 | 4/2013 | Kulkarni et al. | |
| 2014/0358376 | A1* | 12/2014 | Phelan | B60W 10/18 701/41 |
| 2016/0148493 | A1* | 5/2016 | Arakawa | G08B 25/10 348/143 |
| 2016/0277504 | A1* | 9/2016 | Solazzo | H04L 67/12 |
| 2017/0222790 | A1* | 8/2017 | Hooper | H04L 7/0083 |
| 2017/0289959 | A1* | 10/2017 | Aki | H04L 12/403 |
| 2017/0346655 | A1* | 11/2017 | Saito | G05B 23/02 |
| 2017/0352260 | A1* | 12/2017 | Saito | H04W 4/30 |
| 2018/0120810 | A1* | 5/2018 | Sawaragi | G01B 21/045 |
| 2018/0145847 | A1* | 5/2018 | Stamatakis | F24F 11/50 |
| 2018/0183623 | A1* | 6/2018 | Schoenfeld | H04L 12/403 |

FOREIGN PATENT DOCUMENTS

| | | |
|---|---|---|
| JP | 2013-118621 A | 6/2013 |
| JP | 2014-116811 A | 6/2014 |

OTHER PUBLICATIONS

An English translation of a Written Opinion in an International Application No. PCT/JP2016/056157 dated May 17, 2016 from the International Searching Authority.
The International Search Report of PCT/JP2016/056157 dated May 17, 2016.

* cited by examiner

| Pre-replacement sensor | Sensor ID |
|---|---|
| 3 | x0030 |
| 3a | x003a |
| 3b | x003b |
| 3c | x003c |

FIG. 4B

| Wireless connection sensor | Sensor ID |
|---|---|
| 2a | x002a |
| 2b | x002b |
| 2c | x002c |

FIG. 5

RADIO

CROSS REFERENCE TO RELATED APPLICATIONS

This application is a continuation application of International Application No. PCT/JP2016/056157, filed on Mar. 1, 2016, which claims priority based on the Article 8 of Patent Cooperation Treaty from prior Japanese Patent Application No. 2015-044822, filed on Mar. 6, 2015, the entire contents of which are incorporated herein by reference.

TECHNICAL FIELD

The disclosure relates to a radio that is connected to a system constituted by a master control apparatus and a slave control apparatus via the slave control apparatus.

RELATED ART

In a system having a master control apparatus and a plurality of slave control apparatuses, by placing the slave control apparatuses under the control of the master control apparatus, it is possible to allocate various processes to the control apparatuses and to allow the overall system to execute complicated processing. Such a system is utilized in various fields, and for example, with technology disclosed in Patent Document 1, by connecting a master control apparatus and a plurality of slave control apparatuses through wireless communication, constraints relating to the arrangement between control apparatuses are basically removed, and the system can be constructed without physical restriction. However, in such a system, in order to achieve operational cooperation between the control apparatuses, it is necessary to synchronize the control apparatuses. In view of this, in order to achieve synchronization, a network clock of a wireless network is utilized.

RELATED ART DOCUMENTS

Patent Documents

Patent Document 1: JP 2014-116811A

SUMMARY OF THE INVENTION

Problem to be Solved by the Invention

In the field of FA (factory automation) as well, a mode is widely utilized in which various control devices are connected to a system formed by connecting a master control apparatus and slave control apparatuses with a predetermined communication method, and driving of the control apparatuses is controlled by a control signal transmitted from the master control apparatus. In particular, control apparatuses and the like relating to the FA field are used in a manufacturing line in a factory, and thus regulative stability is strongly required. Thus, there is a tendency to avoid transmission and reception of signals between control apparatuses via wireless communication. This is because in the case of wireless communication, transmission and reception of signals will not always succeed due to noise in the factory or the like.

Meanwhile, in the FA field as well, in recent years, when data measured by sensors is collected, in order to efficiently transfer data from the sensors that are disposed in a wide range to the control apparatuses, there is a need to utilize wireless communication. Also, a target for wireless communication may not only be a sensor but also various driving apparatuses. However, as described above, because wireless communication has not been positively utilized in the FA field so far, sufficient studies have not been conducted on a configuration for collecting data measured by the sensors or for wireless driving of a driving apparatus via wireless communication. That is, with the conventional technology, it is not easy to perform control, via wireless communication, of a driving apparatus including a sensor.

One or more embodiments have been made in view of such a problem, and an object of one or more embodiments is to provide technology for easily introducing a radio into a system constituted by a master control apparatus and a slave control apparatus in the FA field.

Means for Solving the Problems

In one or more embodiments, in order to resolve the above-described issues, a configuration is adopted in which a radio that is capable of performing wireless communication with one driving apparatus is connected through one communication port of a slave control apparatus with a cable, and data transfer is mediated between a master control apparatus and the one driving apparatus such that the one driving apparatus is directly connected to the radio. Accordingly, regardless of the one driving apparatus being connected to the radio side via wireless communication, when viewed from the master control apparatus, the one driving apparatus appears to be present on the radio side. Thus, it is possible to achieve introduction of the radio while the master control apparatus and the slave control apparatus are as remain in a conventional manner with regard to communication with a driving apparatus.

Specifically, a radio according to one or more embodiments is formed to be capable of performing wireless communication with one driving apparatus, and configured to be connected, via wired communication, to a slave control apparatus configured to be communicably connected to a master control apparatus with a predetermined communication method, the radio including a connection unit that connects the radio to the slave control apparatus such that the wired communication can be performed through one communication port among a plurality of communication ports provided in the slave control apparatus, an identification information collection unit that collects, from the one driving apparatus, identification information for identifying the one driving apparatus, when the radio is initially connected to the one driving apparatus via the wireless communication, and a transfer control unit that mediates data transfer between the master control apparatus and the one driving apparatus, such that the one driving apparatus is directly connected to the one communication port in a virtual manner, based on the identification information of the one driving apparatus collected by the identification information collection unit.

A communication method used in the FA field, such as IO link or Asi-bus, can be utilized as a predetermined communication method utilized between the master control apparatus and the slave control apparatus. Here, the slave control apparatus is a control apparatus that is placed under the control of the master control apparatus in terms of communication when control apparatuses having equivalent functions are connected in a bus configuration. Therefore, the slave control apparatus is subordinated to the master control apparatus in terms of communication, and, the slave control apparatus is controlled by the master control apparatus, in accordance with instructions from the master control apparatus, and furthermore, a driving device connected to the slave control apparatus is also controlled in accordance with instructions from the master control apparatus.

Here, the radio according to one or more embodiments is connected to the slave control apparatus through one communication port of the slave control apparatus so as to be capable of performing wired communication with the slave control apparatus, and the radio is configured to be capable of performing wireless communication with one driving apparatus. Here, when one driving apparatus is initially connected to the radio via wireless communication, the identification information collection unit collects identification information of this one driving apparatus. Note that initial connection between this radio and the one driving apparatus includes not only a state in which the radio and the one driving apparatus are physically connected to each other but also a state in which it becomes possible for signals to be transmitted and received between the radio and the one driving apparatus. That is, this initial connection refers to a state in which it becomes possible for signals to be substantively transmitted and received between the radio and the one driving apparatus.

Moreover, the transfer control unit mediates data transfer between the master control apparatus and the one driving apparatus, utilizing the collected identification information of the one driving apparatus, and thereby forms a virtual state in which the one driving apparatus, which is controlled by the master control apparatus, is directly connected to the slave control apparatus. That is, the transfer control unit forms one virtual driving apparatus that is directly connected to the slave control apparatus by utilizing the collected identification information. Thus, the master control apparatus transfers data to the one virtual driving apparatus that is directly connected to the slave control apparatus. That is, the data transferred from the master control apparatus is received by the transfer control unit as the one virtual driving apparatus, or the transfer control unit transfers the data transferred from the one driving apparatus to the master control apparatus as the one virtual driving apparatus.

Accordingly, the master control apparatus performs processing relating to data transfer, using one driving apparatus connected to the radio via wireless communication as a driving apparatus that is connected to one communication port of the slave control apparatus. Therefore, the system constituted by a master control apparatus and a slave control apparatus remains the same as a conventional system with regard to communication with a driving apparatus, and by connecting the radio to the slave control apparatus with a cable, it is possible to realize data transfer with the one driving apparatus via wireless communication and accordingly the radio can be easily introduced into a system.

Here, the radio may be formed to be capable of performing wireless communication with a plurality of driving apparatuses including the one driving apparatus. In this case, the connection unit connects the radio to the slave control apparatus, such that the wired communication can be performed through a plurality of communication ports provided in the slave control apparatus including the one communication port that correspond in number to the number of the plurality of driving apparatuses. Moreover, the identification information collection unit collects, from the driving apparatuses, pieces of identification information for identifying the driving apparatuses, when the radio is initially connected to the plurality of driving apparatuses via the wireless communication, and the transfer control unit mediates data transfer between the master control apparatus and the plurality of driving apparatuses, such that the plurality of driving apparatuses are respectively directly connected to the plurality of communication ports in a virtual manner, based on the pieces of identification information of the plurality of driving apparatuses that are collected by the identification information collection unit.

Even in a case where a plurality of driving apparatuses are connected to the radio via wireless communication in this manner, a virtual state in which the driving apparatuses are directly connected to a plurality of communication ports of the slave control apparatus is formed by the transfer control unit mediating data transfer. Thus, the master control apparatus performs processing relating to data transfer with an assumption that the driving apparatuses that are actually connected to the radio via wireless communication are driving apparatuses that are connected to the communication ports of the slave control apparatus. As a result, the system constituted by the master control apparatus and the slave control apparatus can realize data transfer with the driving apparatuses via wireless communication by only connecting the radio to the slave control apparatus with a cable, while there is no change from a conventional system with regard to communication with the plurality of driving apparatuses.

Also, in the above-described radio, in a pre-replacement state before the radio is connected to the slave control apparatus through the plurality of communication ports, a plurality of pre-replacement driving apparatuses corresponding to the plurality of driving apparatuses may be directly connected to the slave control apparatus through the plurality of communication ports. At this time, the master control apparatus may have pieces of identification information of the plurality of pre-replacement driving apparatuses that are connected to the slave control apparatus in the pre-replacement state. Moreover, in this case, the transfer control unit, when the radio is initially connected to the slave control apparatus by the connection unit, acquires, from the master control apparatus, the pieces of identification information of the plurality of pre-replacement driving apparatuses that are provided in the master control apparatus, and mediates the data transfer such that the plurality of driving apparatuses are respectively directly connected, in a virtual manner, to the communication ports to which a corresponding one of the plurality of pre-replacement driving apparatuses is connected, by corresponding the acquired pieces of identification information of the plurality of pre-replacement driving apparatuses to the pieces of identification information of the plurality of driving apparatuses that are collected by the identification information collection unit.

The above-described pre-replacement state refers to a state before the radio according to one or more embodiments is introduced into the system constituted by the master control apparatus and the slave control apparatus. In this pre-replacement state, a plurality of pre-replacement driving apparatuses corresponding to a plurality of post-replacement driving apparatuses are respectively directly connected to the plurality of communication ports of the slave control apparatus. In the state in which the pre-replacement driving apparatuses are directly connected to the slave control apparatus in this manner, the pre-replacement driving apparatuses and the slave control apparatus are in a physically restricted state, and thus it is not easy to dispose the driving apparatuses freely. Here, in this pre-replacement state, the master control apparatus has identification information of each pre-replacement driving apparatus.

Moreover, when the radio is initially connected to the slave control apparatus by a connection unit, that is, when the plurality of pre-replacement driving apparatuses and the plurality of driving apparatuses are replaced with each other, the transfer control unit corresponds pieces of the identification information of the plurality of pre-replacement driving apparatuses provided in the master control apparatus to pieces of the identification information of the plurality of driving apparatuses that are newly connected thereto. Accordingly, the master control apparatus can transfer data to the driving apparatuses after the radio is introduced, while maintaining a state in which data is transferred to the pre-replacement driving apparatuses before the radio is introduced. Note that with regard to this correspondence, the transfer control unit may link the plurality of pre-replacement driving apparatuses with the plurality of driving apparatuses, or if the plurality of pre-replacement driving apparatuses and the plurality of driving apparatuses have any correlation, suitable linking can also be formed by providing the radio with information relating to this correlation via input by a user or the like.

Here, in the above-described radio, the transfer control unit may form a state in which the plurality of driving apparatuses are directly connected to the plurality of communication ports of the slave control apparatus in a virtual manner, by associating the pieces of identification information of the plurality of driving apparatuses that are collected by the identification information collection unit with the plurality of communication ports of the radio that respectively correspond to the plurality of communication ports of the slave control apparatus. Accordingly, the system constituted by the master control apparatus and the slave control apparatus is capable of performing data transfer to the plurality of driving apparatuses via the radio, while there is no change from the conventional system with regard to communication with the plurality of driving apparatuses.

Here, in the above-described radio, the plurality of driving apparatuses may each be a sensor that measures a predetermined environmental parameter. In addition, the driving apparatus may be an actuator whose driving is controlled by the master control apparatus. Also, the plurality of driving apparatuses may include the above-described sensor and the above-described actuator.

Effects of the Invention

It is possible to provide technology for easily introducing a radio into a system constituted by a master control apparatus and a slave control apparatus in the FA field.

EMBODIMENTS OF THE INVENTION

A control system to which a radio 1 according to one or more embodiments is connected, and that includes a master control apparatus 20 and slave control apparatuses 30 and 40, the radio 1 included in this control system and the control apparatuses 20, 30, and 40 will be described with reference to the drawings. Note that the configuration of the following embodiments is merely an example, and the present invention is not limited to the configuration of this embodiment.

Figure 1A:
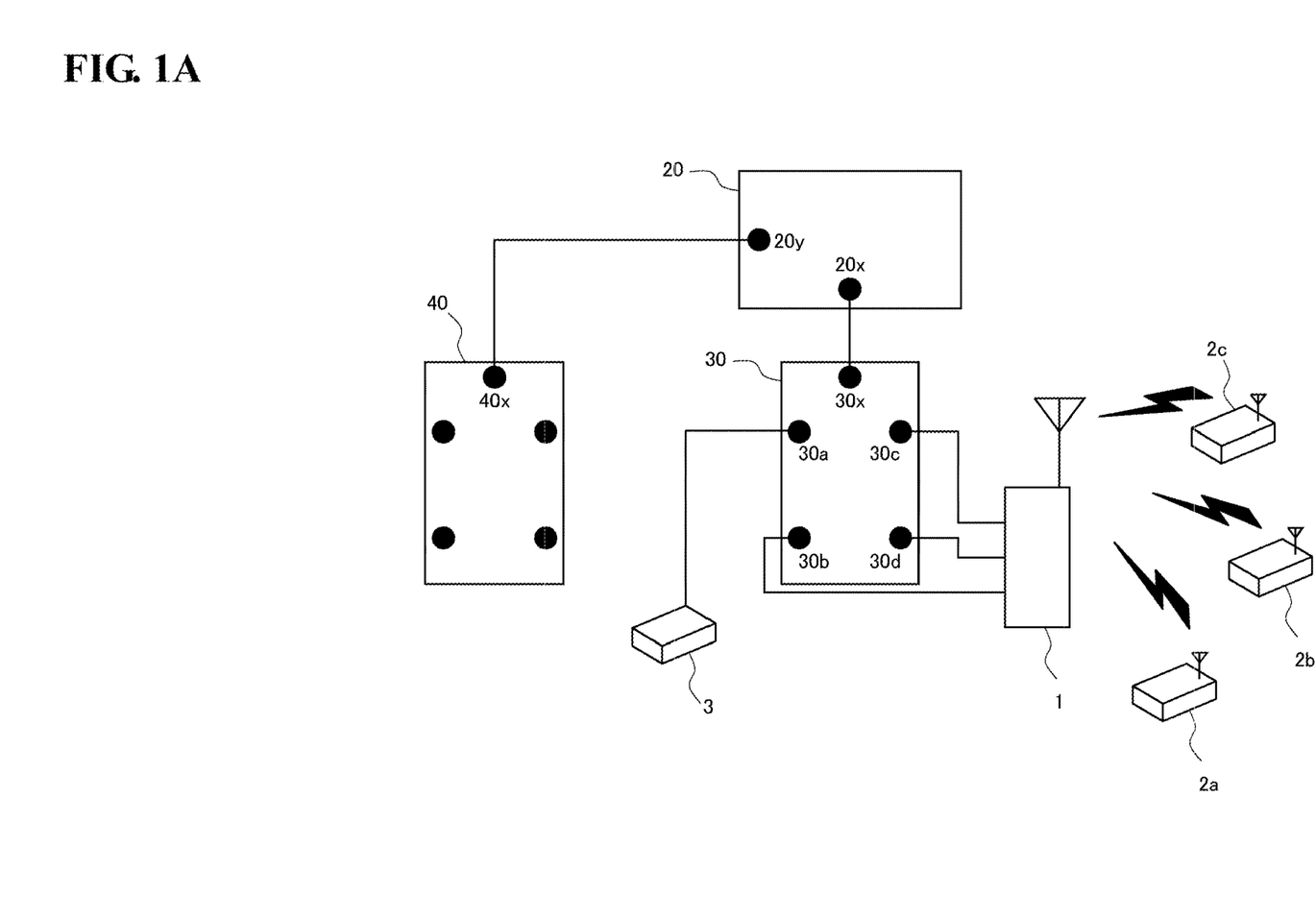
FIG. 1A is a diagram showing a schematic configuration of a system constituted by a master control apparatus and slave control apparatuses, and to which a radio according to one or more embodiments is connected.

The control system shown in FIG. 1A is a system that is to be mainly used in the FA field and is formed by connecting two slave control apparatuses 30 and 40 to the master control apparatus 20. Moreover, a control signal and predetermined data are transferred between the control apparatuses in accordance with a predetermined communication method that is normally used in the FA field. Examples of this predetermined communication method include an IO link method and an Asi-bus method. Although a detailed description thereof is omitted in this specification because these communication methods are known in the FA field, for example, the IO link method is IO technology for enabling communication between the master control apparatus and the slave control apparatuses, and devices in the lowermost level that are connected thereto, and conforms to IEC 61131-9.

In the control system shown in FIG. 1A, the master control apparatus 20 includes a plurality of communication ports, and FIG. 1 shows communication ports 20$x$ and 20$y$. The master control apparatus 20 is communicably connected to the slave control apparatuses 30 and 40 with cables through the communication ports. Note that communication between the master control apparatus 20 and the slave control apparatuses 30 and 40 is point-to-point communication. Here, the slave control apparatus 30 is connected to the master control apparatus 20 through the communication port 20$x$ via a cable, and at this time, the communication port of the slave control apparatus 30 is a communication port 30$x$. Also, the slave control apparatus 40 is connected to the master control apparatus 20 through the communication port 20$y$ via a cable, and at this time, the communication port of the slave control apparatus 40 is a communication port 40$x$.

In this embodiment, the slave control apparatus 30 will be described in detail. The slave control apparatus 30 includes four communication ports 30$a$ to 30$d$ in addition to the communication port 30$x$. A device at a lower layer is connected to each communication port, and specifically, a sensor 3 is connected to the slave control apparatus 30 through the communication port 30$a$ with a cable. Furthermore, the radio 1 is connected to the slave control apparatus 30 through the communication ports 30$b$, 30$c$, and 30$d$ with cables. That is, the radio 1 has communication ports corresponding to a predetermined communication method, and specifically, the radio 1 is provided with three communication ports corresponding to the slave control apparatuses 30$b$, 30$c$, and 30$d$, the communication ports of the slave control apparatus and the communication ports of the radio 1 are connected one-to-one with cables, and communication between the slave control apparatus 30 and the radio 1 is also point-to-point communication corresponding to a predetermined communication method.

This radio 1 is provided with a plurality of sensors having a radio function (in this embodiment, three sensors 2a to 2c) so as to be capable of performing wireless communication therewith. Note that wireless communication between the radio 1 and each of the sensors 2a to 2c can use any suitable communication method. In the system that is formed in this manner and shown in FIG. 1A, pieces of measured data that are measured by the sensor 3 and the sensors 2a to 2c are collected in the master control apparatus 20 through the slave control apparatus 30 in accordance with instructions from the master control apparatus 20.

Note that the sensor 3 and the sensors 2a to 2c are sensors for measuring predetermined outside environment parameters (temperature, humidity, acceleration, and the like). For example, physical system sensors such as a magnetic sensor, a photoelectric sensor, a temperature sensor, a humidity sensor, an illuminance sensor, a flow sensor, a pressure sensor, a ground temperature sensor, and a particle sensor, and chemical system sensors such as a $CO_2$ sensor, a pH sensor, an EC sensor, and a soil moisture sensor can be provided in the sensors. In the present embodiment, in order to simplify the description, it is assumed that the sensor 3 and the sensors 2a to 2c are provided with only a temperature sensor for measuring the external temperature at positions at which the sensors are disposed, and data collected in the master control apparatus 20 is temperature data measured thereby.

Figure 1B:
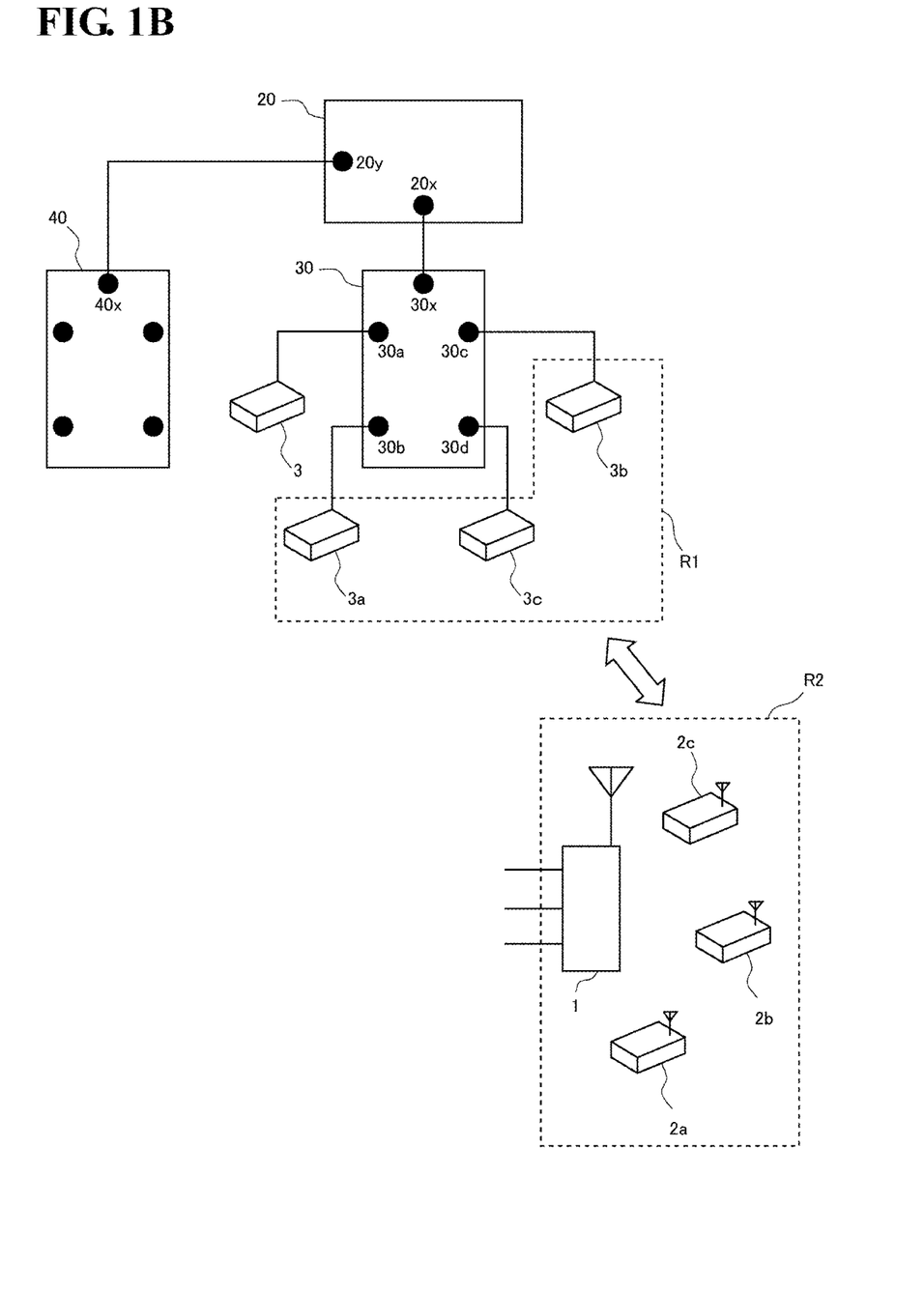
FIG. 1B is a diagram showing a schematic configuration of a system constituted by a master control apparatus and slave control apparatuses before the system, such as in FIG. 1, is formed.

Before a detailed description of the operations of the control system formed in this manner, the process leading to the formation of this control system will be described with reference to FIG. 1B. FIG. 1B is a diagram showing the mode of the control system prior to the formation of the mode shown in FIG. 1A. Although the modes of connection of the slave control apparatuses 30 and 40 to the master control apparatus 20 are the same, the mode of connection of the sensors to the slave control apparatus 30 differs from that shown in FIG. 1A. Specifically, in FIG. 1B, the sensor 3 and the sensors 3a to 3c are connected to the four communication ports 30a to 30d of the slave control apparatus 30. Moreover, the sensors are connected to the slave control apparatus 30 with cables through the communication ports.

Moreover, as shown in FIG. 1B, by replacing constituent elements (that is, the sensors 3a to 3c) that are connected to the slave control apparatus 30 in a region R1 surrounded by dotted lines with constituent elements (that is, the radio 1 and the sensors 2a to 2c that are wirelessly connected to the radio 1) in a region R2 surrounded by dotted lines, the control system shown in FIG. 1A is constructed. That is, the sensors are connected to the slave control apparatus 30 with the four cables before replacement, whereas the radio 1 is present between three of the four sensors and the slave control apparatus 30 after replacement. At this time, the number of wired connections between the slave control apparatus 30 and the radio 1 is three before and after replacement. Use of the radio 1 in this manner makes it possible to widely select locations at which the sensors 2a to 2c for wireless connection to the radio 1 are installed and to effectively execute collection of the temperature data.

On the other hand, compared to the control system shown in FIG. 1B, the radio 1 is introduced into the control system shown in FIG. 1A, and thus when information measured by the sensor is collected from the master control apparatus 20, a control signal and measurement information need to be transferred with consideration for the presence of the radio 1. Then, in the master control apparatus 20 and the slave control apparatus 30, modification processing (processing for handling the introduction of the radio 1 from a state before introduction of the radio 1) for handling the introduction of the radio 1 is required, and some kind of burden will be imposed on a user of the control system.

Figure 2:
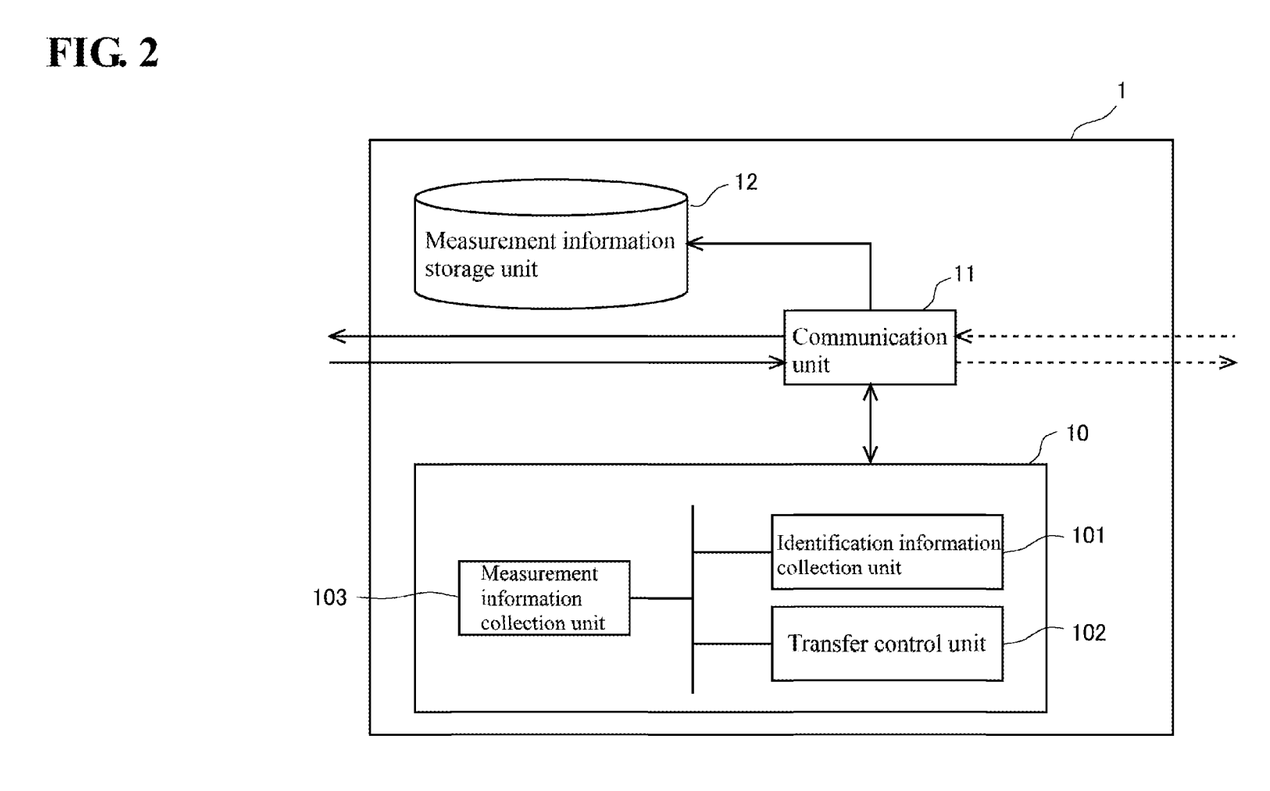
FIG. 2 is a functional block diagram of a radio 1, such as in FIG. 1A.

In view of this, in the control system shown in FIG. 1A, in order to reduce the burden of the control system imposed on the user as much as possible when the radio 1 is introduced, the radio 1 is devised as shown in FIG. 2. The radio 1 internally has an arithmetic unit, a memory, and the like, and exhibits not only a wired communication function and a wireless communication function but also various functions due to a predetermined control program being executed by these arithmetic units. Moreover, FIG. 2 is a functional block diagram showing an illustration of the functions of the radio 1. Note that although not shown, similarly, the master control apparatus 20 and the slave control apparatus 30 also have various functional units.

Here, the functional units provided in the radio 1 will be described with reference to FIG. 2. The radio 1 has a control unit 10, a communication unit 11, and a measurement information storage unit 12 as functional units. The control unit 10 is a functional unit that handles various controls in the radio 1, and in particular, has an identification information collection unit 101, a transfer control unit 102, and a measurement information collection unit 103. The identification information collection unit 101 is a functional unit that collects identification information for enabling identification of sensors individually when the radio 1 is connected to an object to be connected via wireless communication, that is, the radio 1 is connected to the sensors 2a to 2c for the first time. This identification information is also used in order for the slave control apparatus 30 and the master control apparatus 20 to identify sensors, and thus has a data configuration that can be grasped by these control apparatuses. For example, when the predetermined communication method between the master control apparatus 20 and the slave control apparatus 30 is the IO link method, an IODD profile corresponding to each sensor in accordance with this IO link method can be used as this identification information.

Also, the transfer control unit 102 is a functional unit that mediates data transfer between the master control apparatus 20 and the sensors 2a to 2c such that communication can be performed in a state in which the sensors 2a to 2c are respectively connected to the corresponding communication ports 30b to 30d of the slave control apparatus 30 in a virtual manner when viewed from the master control apparatus 20. Specifically, the sensors are associated with the communication ports of the radio 1 that are connected with the communication ports 30b to 30d of the slave control apparatus 30 with cables, based on pieces of the identification information of the sensors 2a to 2c that are collected by the identification information collection unit 101. This association processing forms a state in which the sensors 2a to 2c are respectively directly connected to the communication ports 30b to 30d of the slave control apparatus 30 in a virtual manner, and can mediate data transfer between the master control apparatus 20 and the sensors. This virtual connection state is a state that is identical to the state shown in FIG. 1B in which the sensors are directly connected to the slave control apparatus 30. In other words, regardless of the state in which the sensors 2a to 2c are actually connected to the radio 1 via wireless communication, the transfer control unit 102 makes it possible for the sensors 2a to 2c to behave as if directly connected to the communication ports 30b to 30d of the slave control apparatus 30 due to the above-described mediation of data transfer.

Next, the measurement information collection unit 103 is a functional unit that collects temperature data from the sensors 2a to 2c via wireless communication, the temperature data being measurement information measured by the sensors 2a to 2c that are connected to the radio 1 so as to be capable of wireless communication. Collection of the temperature data collected by the measurement information collection unit 103 may be performed in accordance with an instruction given by the master control apparatus 20, or may be performed in accordance with an instruction from the radio 1 independently of the master control apparatus 20.

Also, the communication unit 11 is a functional unit that is formed so as to interact with the control unit 10 and communicates with a device external to the radio 1, that is, transmits and receives information to/from the external device. Thus, the communication unit 11 is a functional unit that performs transmission and reception with the sensors 2a to 2c via wireless communication and performs transmission and reception with the slave control apparatus 30 via wired communication. Thus, the communication unit 11 also includes a function as a transmission and reception unit of the radio 1. Also, the communication unit 11 handles reception at the time of collection of information by the identification information collection unit 101 and the measurement information collection unit 103, and transmission and reception for mediating data transfer by the transfer control unit 102. Note that wireless communication performed by the communication unit 11 is expressed with dotted lines and wired communication is expressed with solid lines in FIG. 2. Also, the measurement information storage unit 12 is a functional unit that stores temperature data collected by the measurement information collection unit 103 and measured by the sensors in the memory.

Also, although not shown, the master control apparatus 20 and the slave control apparatus 30 are provided with various functional units. That is, functional units for controlling the slave control apparatuses 30 and 40 that are connected to the master control apparatus 20 or a driving apparatus (for example, the sensor 3) other than the radio 1 connected to the slave control apparatus 30, and the like are provided.

Temperature Data Collection Processing

Figure 3:
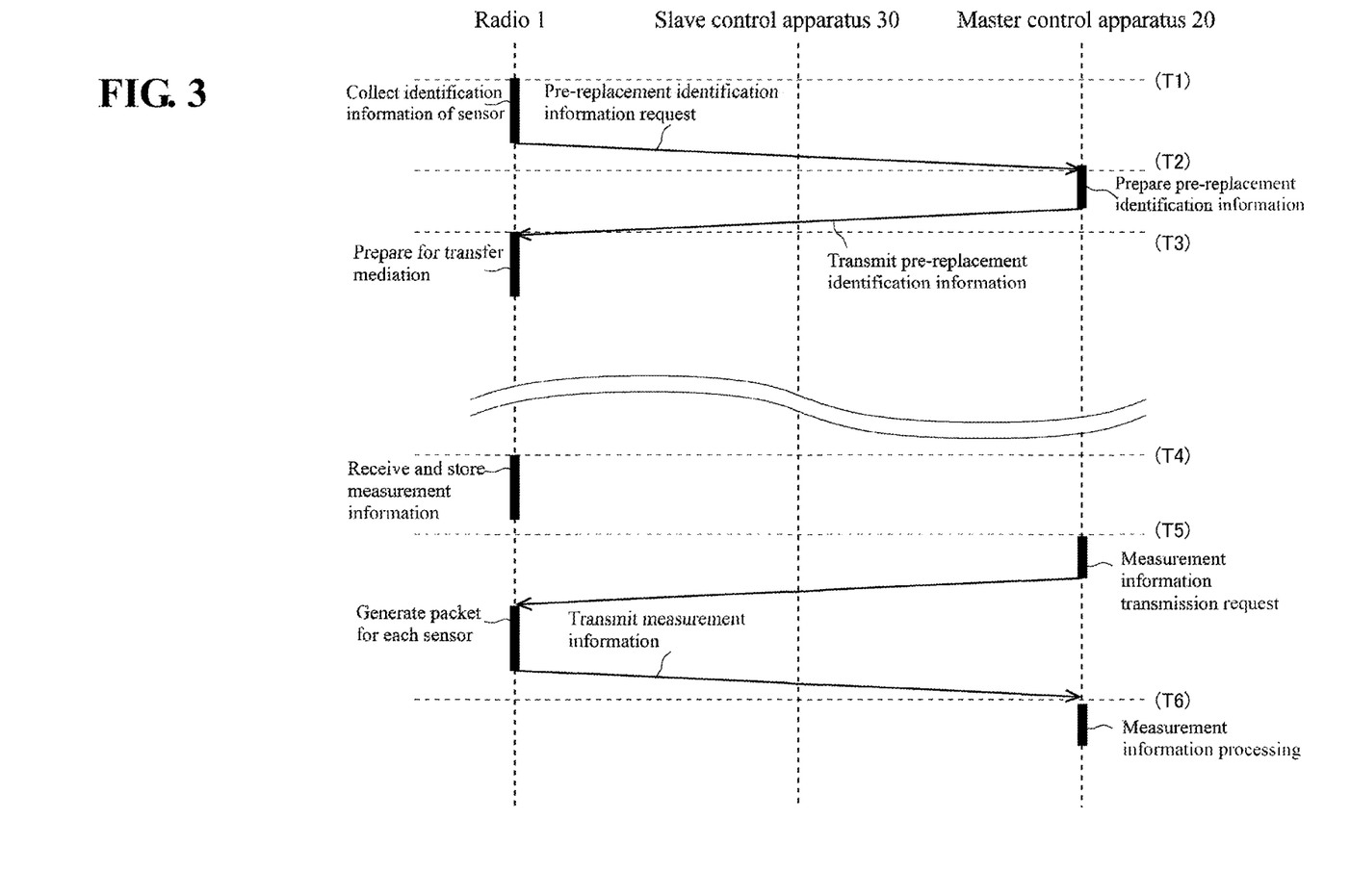
FIG. 3 is a diagram showing a sequence relating to processing for transference of measurement information that is performed between a radio 1, a slave control apparatus 30, and a master control apparatus 20 in a system, such as in FIG. 1A.

Here, FIG. 3 shows a sequence diagram of processing for collecting temperature data by the control system shown in FIG. 1A. Note that the sequence shown in FIG. 3 shows the flow of processing starting from a time T1 at which the sensors 3a to 3c connected to the slave control apparatus 30 in a pre-replacement state shown in FIG. 1B are replaced with a state in which the sensors 2a and 2b and the slave control apparatus 30 are connected to each other via the radio 1 as shown in FIG. 1A.

First, the radio 1 is connected to the slave control apparatus 30 with cables through the communication ports 30b, 30c, and 30d at the time T1. Accordingly, the radio 1 is recognized by the slave control apparatus 30, and pieces of the identification information of the sensors are collected in the radio 1 by the identification information collection unit 101, the identification information indicating a wirelessly connectable sensor. When the identification information is collected, as shown in FIG. 1B, the radio 1 transmits, to the master control apparatus 20, a request signal for requesting pieces of identification information of the sensors that are connected to the slave control apparatus 30, that is, pieces of the identification information (pre-replacement identification information) of the sensor 3 and sensors 3a to 3c in the pre-replacement state.

Figure 4A:
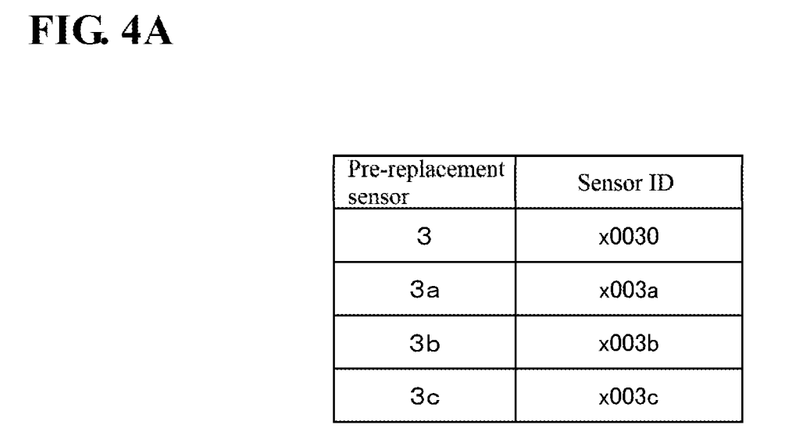
FIG. 4A is a diagram showing one example of a configuration of data relating to pieces of identification information of sensors provided in a master control apparatus when a system, such as in FIG. 1B, is constructed.
Figure 4B:
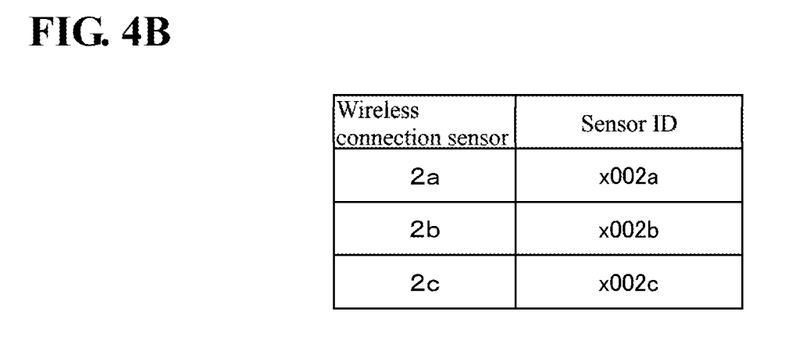
FIG. 4B is a diagram showing one example of configuration of data relating to pieces of identification information of sensors that are collected by a radio when a system, such as in FIG. 1A, is constructed.

Here, FIG. 4A shows one example of data configuration of pre-replacement identification information. As shown in FIG. 1B, when the master control apparatus 20 collects temperature data measured by the sensors 3 and 3a to 3c that are connected to the slave control apparatus 30 with cables, the master control apparatus 20 collects pieces of the identification information (for example, IODD profiles) in order to recognize these sensors. In view of this, as shown in FIG. 4A, the pre-replacement identification information stores pieces of the identification information of the sensors 3 and 3a to 3c before replacement. Also, FIG. 4B shows data that stores pieces of the identification information of the sensors 2a to 2c that are collected by the identification information collection unit 101. This collected identification information include pieces of the identification information of the sensors 2a to 2c after replacement.

Returning to FIG. 3 again, at a time T2, the master control apparatus 20 receives a request of the pre-replacement identification information from the radio 1, thereafter prepares for transmitting this pre-replacement identification information, and transmits the pre-replacement identification information to the radio 1. Then, the radio 1 receives this pre-replacement identification information at a time T3. Then, in the radio 1, the transfer control unit 102 prepares the above-described data transfer mediation processing, that is, as described above, performs processing for associating the sensors 2a to 2c that are newly wirelessly connected and the communication port s of the radio 1 that are respectively connected to the communication ports 30b to 30d of the slave control apparatus 30 with cables.

For example, in this association processing, the pre-replacement identification information that is acquired earlier and the collected identification information of the sensors 2a to 2c are used. Among sensors included in the pre-replacement identification information, sensors that are not included therein at this point in time are the sensors 3a to 3c. Thus, the sensors 2a to 2c are associated with the communication ports of the radio 1 corresponding to the communication ports 30b to 30d of the slave control apparatus 30 to which the sensors 3a to 3c are connected. Then, the communication ports are linked with the sensors by the user of the control system providing the radio 1 with information relating to the correspondence between sensors before and after replacement. For example, the sensors 2a, 2b, and 2c may be linked with the communication ports of the radio corresponding to the communication ports 30b, 30c, and 30d to which the sensors 3a, 3b, and 3c are connected. Also, as another method, the sensors and the communication ports may be automatically linked by the transfer control unit 102.

In this manner, processes from the time T1 to the time T3 shown in FIG. 3 are pre-processing for collecting temperature data performed by the control system. Processes at a time T4 onward, which will be described below, are processes for actually collecting temperature data.

First, the radio 1 collects the pieces of temperature data that were measured by the sensors at the time T4 using the measurement information collection unit 103. The collected temperature data is stored in the measurement information storage unit 12. Thereafter, at a time T5, the master control apparatus 20 requests the sensors to transmit the measured temperature data. However, this request is actually output to the radio 1 due to the association processing as described above. That is, when viewed from the master control apparatus 20, a temperature data transmission request is delivered to a sensor that appears to be directly connected to the slave control apparatus 30 in a virtual manner, that is, to the transfer control unit 102 of the radio 1. Thus, the transfer control unit 102 that received this transmission request generates a communication packet that stores the temperature data for each sensor. Thereafter, the communication packets including the pieces of temperature data measured by the sensors 2a, 2b, and 2c are respectively transmitted to the master control apparatus 20 through the communication ports 30b, 30c, and 30d. Then, at a time T6, the master control apparatus 20 stores the pieces of temperature data received from the sensors in the memory thereof, and predetermined processing relevant to the temperature data is executed.

Note that although the number of instances of transmission of the temperature data from the radio 1 to the slave control apparatus 30 is only one in FIG. 3, collection of the temperature data by the radio 1 is repeated at appropriate time intervals. Also, in FIG. 3, the measured temperature data is transferred from the radio 1 to the master control apparatus 20, but may be temporarily stored from the radio 1 in the slave control apparatus 30. In this case, the slave control apparatus 30 outputs a temperature data transmission request to the sensors that are virtually in a directly connected state. Moreover, the master control apparatus 20 may request the slave control apparatus 30 to transmit the stored temperature data.

In this manner, in the control system shown in FIG. 1A, effective collection of temperature data is realized by information collection utilizing wireless communication. Thus, although the radio 1 is disposed between the slave control apparatus 30 and the sensors 2a to 2c, as described above, a state in which the sensors are directly connected to the communication ports of the slave control apparatus 30 in a virtual manner is formed by the transfer control unit 102, and thus the slave control apparatus 30 and the master control apparatus 20 can perform communication as before in a conventional manner with regard to data transfer with the sensors, in other words, similarly to the state shown in FIG. 1B that exists before the radio 1 is introduced. Therefore, the load of introducing the radio 1 on a user is suppressed as much as possible.

Also, when the replacement state shown in FIG. 1B is substituted with the connection state shown in FIG. 1A, in particular, by automatically performing pre-processing at the time T1 to the time T3 shown in FIG. 3, it is possible to execute aggregating of the temperature data by the radio 1 while suppressing the load of forming the control system shown in FIG. 1A on the user as much as possible.

Modification

Figure 5:
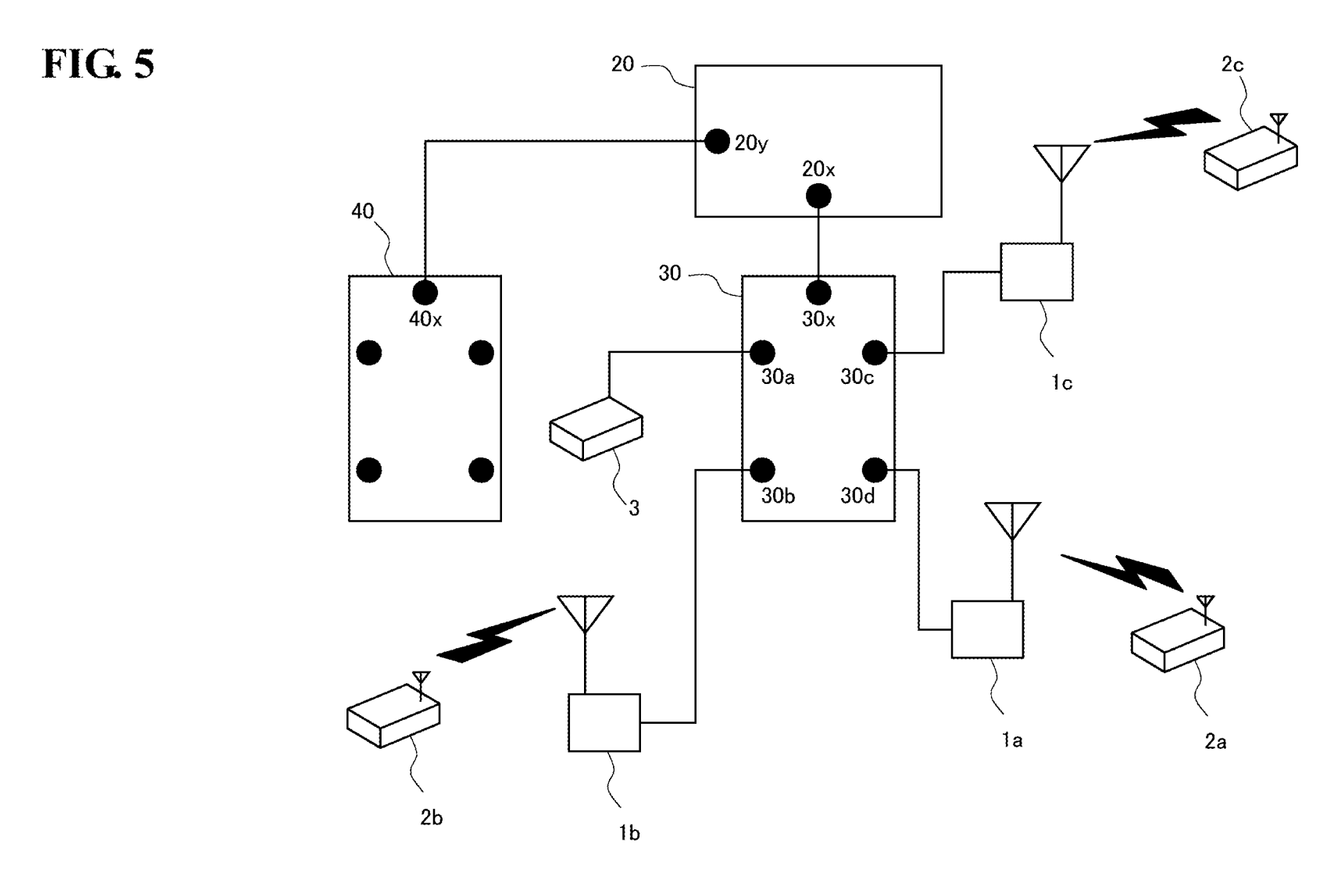
FIG. 5 is a second diagram showing a schematic configuration of a system constituted by a master control apparatus and slave control apparatuses, and to which radios according to one or more embodiments are connected.

A modification of the control system formed by the master control apparatus 20 and the slave control apparatuses 30 and 40 will be described with reference to FIG. 5. A difference between the control system shown in FIG. 5 and the control system shown in FIG. 1A is that radios 1a to 1c corresponding to sensors 2a to 2c that perform wireless communication are connected to communication ports 30d, 30b, and 30c of a slave control apparatus 30 with cables. Moreover, similarly to the radio 1, the radios 1a to 1c each have the functional units shown in FIG. 2. The load of introducing the radios for forming the control system shown in FIG. 5 on the user is suppressed as much as possible by transfer control units in the radios carrying out substantively the same functions as the above-described transfer control unit 102.

INDEX TO THE REFERENCE NUMERALS 1, 1a, 1b, 1c Radio
2a, 2b, 2c Sensor
20 Master control apparatus
30, 40 Slave control apparatus

The invention claimed is:

1. A radio comprising a processor configured with a program to perform operations comprising:
  operation as a connection unit that connects the radio to a slave control apparatus communicably connected to a master control apparatus, the connection unit enabling wired communication to be performed through one communication port among a plurality of communication ports provided in the slave control apparatus;
  operation as an identification information collection unit that collects, from one driving apparatus, identification information for identifying the one driving apparatus, in response to the radio being initially connected to the one driving apparatus via wireless communication; and
  operation as a transfer control unit that mediates data transfer between the master control apparatus and the one driving apparatus, such that the one driving apparatus is directly connected to the one communication port in a virtual manner, by associating the one driving apparatus to the communication port based on associating the identification information of the one driving apparatus collected by the identification information collection unit with a piece of identification information corresponding to the communication port collected in the master control apparatus.

2. The radio according to claim 1, wherein
the radio is capable of performing wireless communication with a plurality of driving apparatuses comprising the one driving apparatus,
the processor is configured with the program such that:
  operation as the connection unit comprises operations as the connection unit that connects the radio to the slave control apparatus, such that the wired communication can be performed through the plurality of communication ports provided in the slave control apparatus comprising the one communication port that correspond in number to the number of the plurality of driving apparatuses,
  operation as the identification information collection unit comprises operation as the identification information collection unit that collects, from the driving apparatuses, pieces of identification information for identifying the driving apparatuses, in response to the radio being initially connected to the plurality of driving apparatuses via the wireless communication, and
  operation as the transfer control unit comprises operation as the transfer control unit that mediates data transfer between the master control apparatus and the plurality of driving apparatuses, such that the plurality of driving apparatuses are respectively directly connected to the plurality of communication ports in the virtual manner, based on the pieces of identification information of the plurality of driving apparatuses that are collected by the identification information collection unit.

3. The radio according to claim 2, wherein
in a pre-replacement state before the radio is connected to the slave control apparatus through the plurality of communication ports, a plurality of pre-replacement driving apparatuses corresponding to the plurality of driving apparatuses are directly connected to the slave control apparatus through the plurality of communication ports, the master control apparatus comprises pieces of identification information of the plurality of pre-replacement driving apparatuses that are connected to the slave control apparatus in the pre-replacement state, and the processor is configured with the program such that:

operation as the transfer control unit comprises operation as the transfer control unit that, in response to the radio being initially connected to the slave control apparatus by the connection unit, acquires, from the master control apparatus, the pieces of identification information of the plurality of pre-replacement driving apparatuses that are provided in the master control apparatus, and mediates the data transfer such that the plurality of driving apparatuses are respectively directly connected, in the virtual manner, to the plurality of communication ports to which a corresponding one of the plurality of pre-replacement driving apparatuses is connected, by corresponding the acquired pieces of identification information of the plurality of pre-replacement driving apparatuses to the pieces of identification information of the plurality of driving apparatuses that are collected by the identification information collection unit.

4. The radio according to claim 2, wherein the processor is configured with the program such that operation as the transfer control unit comprises operation as the transfer control unit that forms a state in which the plurality of driving apparatuses are directly connected to the plurality of communication ports of the slave control apparatus in the virtual manner, by associating the pieces of identification information of the plurality of driving apparatuses that are collected by the identification information collection unit with the plurality of communication ports of the radio that respectively correspond to the plurality of communication ports of the slave control apparatus.

5. The radio according to claim 2, wherein each driving apparatus of the plurality of driving apparatuses comprises a sensor that measures a predetermined environmental parameter.

6. The radio according to claim 1, wherein the one driving apparatus comprises a sensor that measures a predetermined environmental parameter.

* * * * *